US010830887B2

(12) United States Patent
Low et al.

(10) Patent No.: US 10,830,887 B2
(45) Date of Patent: Nov. 10, 2020

(54) OBJECT SENSOR ASSEMBLY INCLUDING STEREOSCOPIC CAMERAS AND RANGE FINDERS

(71) Applicant: Aptiv Technologies Limited, St. Michael (BB)

(72) Inventors: Yew Kwang Low, Singapore (SG); Kok Wee Yeo, Singapore (SG); Binghua Pan, Singapore (SG); Ronald M. Taylor, Greentown, IN (US); Ward K. Everly, Westfield, IN (US)

(73) Assignee: Aptiv Technologies Limited, St. Michael (BB)

( * ) Notice: Subject to any disclaimer, the term of this patent is extended or adjusted under 35 U.S.C. 154(b) by 382 days.

(21) Appl. No.: 15/877,512

(22) Filed: Jan. 23, 2018

(65) Prior Publication Data

US 2019/0227168 A1 Jul. 25, 2019

(51) Int. Cl.
| | |
|---|---|
| *G01S 17/00* | (2020.01) |
| *G01S 17/08* | (2006.01) |
| *H04N 13/239* | (2018.01) |
| *G01S 17/87* | (2020.01) |
| *G01S 17/86* | (2020.01) |
| *G01S 17/931* | (2020.01) |
| *G01C 3/08* | (2006.01) |
| *H04N 5/33* | (2006.01) |
| *H04N 13/00* | (2018.01) |
| *H04N 13/243* | (2018.01) |
| *G01S 13/931* | (2020.01) |
| *H04N 13/254* | (2018.01) |

(52) U.S. Cl.
CPC ............... *G01S 17/08* (2013.01); *G01C 3/08* (2013.01); *G01S 17/86* (2020.01); *G01S 17/87* (2013.01); *G01S 17/931* (2020.01); *H04N 5/33* (2013.01); *H04N 13/239* (2018.05); *G01S 2013/9314* (2013.01); *G01S 2013/9321* (2013.01); *G01S 2013/9323* (2020.01); *G01S 2013/93271* (2020.01); *H04N 13/243* (2018.05); *H04N 13/254* (2018.05); *H04N 2013/0081* (2013.01)

(58) Field of Classification Search
USPC ........................................... 356/4.01
See application file for complete search history.

(56) References Cited

U.S. PATENT DOCUMENTS

| | | | |
|---|---|---|---|
| 5,633,705 A | 5/1997 | Asayama | |
| 7,499,638 B2 * | 3/2009 | Arai ........................ | G01S 17/86 396/108 |
| 9,247,215 B1 | 1/2016 | Athan | |

(Continued)

OTHER PUBLICATIONS

European Search Report for Application No. 19151691.3, European Patent Office, dated May 29, 2019, 2 pages.

*Primary Examiner* — James R Hulka
(74) *Attorney, Agent, or Firm* — Colby Nipper PLLC

(57) ABSTRACT

An illustrative example sensor device includes a plurality of range finders that each have an emitter configured to emit a selected type of radiation and a detector configured to detect the selected type of radiation reflected from an object. A plurality of cameras are configured to generate an image of an object based upon receiving the selected type of radiation from the object. A processor is configured to determine a distance between the sensor device and an object based on at least two of the images, wherein the images are each from a different camera.

20 Claims, 4 Drawing Sheets

(56) References Cited

U.S. PATENT DOCUMENTS

| | | | |
|---|---|---|---|
| 10,161,866 B2 * | 12/2018 | Knox | ................ G01N 15/1463 |
| 2006/0072914 A1 | 4/2006 | Arai et al. | |
| 2017/0146454 A1 | 5/2017 | Knox et al. | |

* cited by examiner

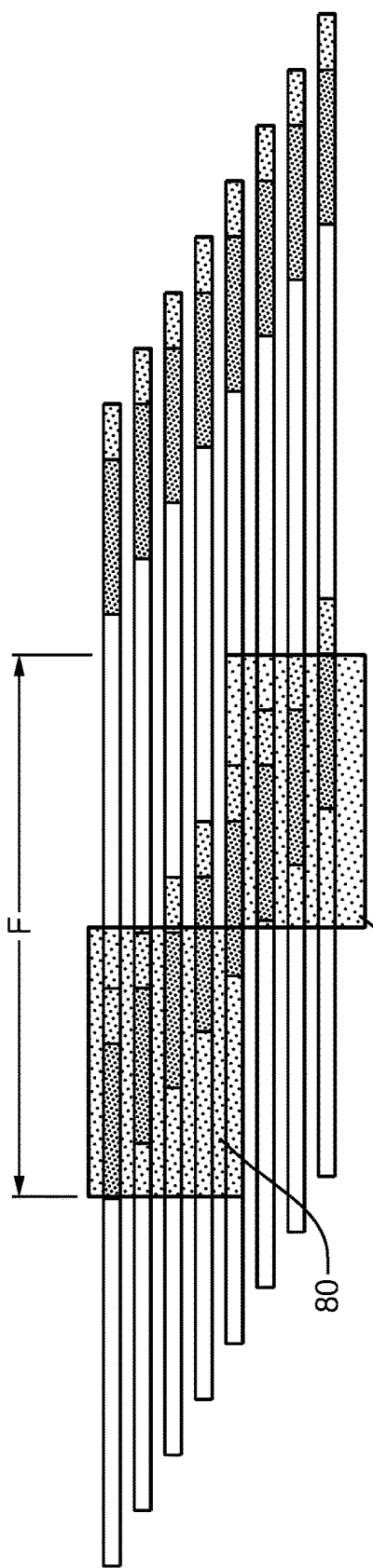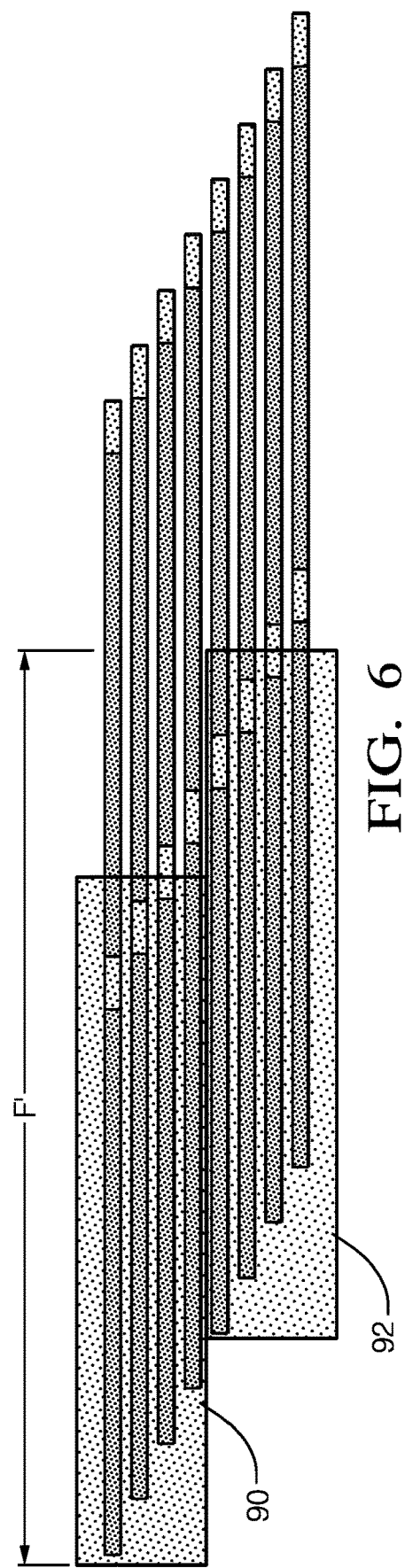

OBJECT SENSOR ASSEMBLY INCLUDING STEREOSCOPIC CAMERAS AND RANGE FINDERS

BACKGROUND

Advances in electronics and technology have made it possible to incorporate a variety of advanced features on automotive vehicles. Various sensing technologies have been developed for detecting objects in a vicinity or pathway of a vehicle. Such systems are useful for parking assist and cruise control adjustment features, for example.

More recently, automated vehicle features have become possible to allow for autonomous or semi-autonomous vehicle control. For example, cruise control systems may incorporate light detection and ranging (LIDAR) for detecting an object or another vehicle in the pathway of a vehicle. Depending on the approach speed, the cruise control setting may be automatically adjusted to reduce the speed of the vehicle based on detecting another vehicle in the pathway of the vehicle.

While LIDAR systems have proven useful, they are not without drawbacks. LIDAR systems require relatively high power laser light sources, high sensitivity sensors, and fast response sensor capabilities. Each of these requirements increases the costs associated with a LIDAR device. Additionally, LIDAR devices typically require accurate and fast beam steering devices. Moreover, there is a significant data processing requirement to achieve three dimensional mapping using a LIDAR system, which requires more processor capacity and increases cost.

Other distance measuring arrangements have been proposed, such as stereoscopic cameras. Differences between images obtained by multiple cameras allow for determining a distance to an object in the camera's field of view. Such camera-based systems suffer from the drawbacks of being susceptible to false positive indications. Essentially any object in the two-dimensional imagery of each camera may be recognized as a distinct object within an image. Additionally, shadows and retro-reflections introduce noise into such images. Further, the processor capacity needed to process the information from an image is considered computationally expensive.

SUMMARY

An illustrative example sensor device includes a plurality of range finders that each have an emitter configured to emit a selected type of radiation and a detector configured to detect the selected type of radiation reflected from an object. A plurality of cameras are configured to generate an image of an object based upon receiving the selected type of radiation from the object. A processor is configured to determine a distance between the sensor device and an object based on at least two of the images, wherein the images are each from a different camera.

An illustrative example method of determining a distance to an object includes emitting a selected type of radiation from a range finder emitter, detecting the selected type of radiation from the object at each of a plurality of cameras, generating an image of the object from each of the cameras, and determining the distance to the object based on at least two of the images of the object, wherein the at least two of the images are each from a different one of the cameras.

The various features and advantages of at least one disclosed example embodiment will become apparent to those skilled in the art from the following detailed description. The drawings that accompany the detailed description can be briefly described as follows.

BRIEF DESCRIPTION OF THE DRAWINGS

FIG. 5 schematically illustrates a timing of radiation emission according to an example embodiment.

FIG. 6 schematically illustrates another example timing of radiation emission.

DETAILED DESCRIPTION

Figure 1:
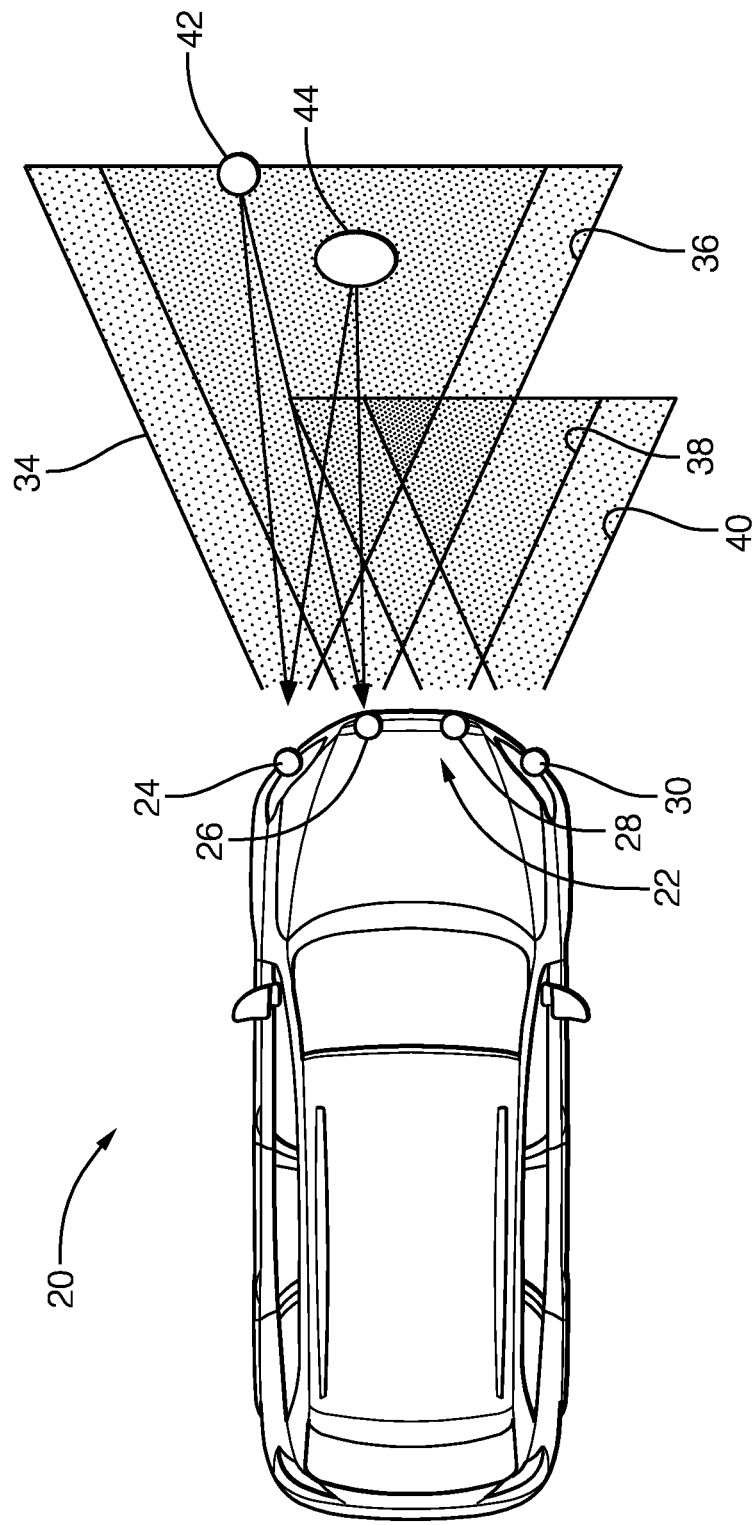
FIG. 1 schematically illustrates a vehicle including a sensor device designed according to an embodiment of this invention.

FIG. 1 schematically illustrates a vehicle 20 including a sensor device 22 that is useful for detecting an object in a vicinity of the vehicle 20. The sensor device 22 allows for selectively determining or approximating a distance to a detected object, a location of the object and a size of the object. In this example, the sensor device 22 includes a plurality of range finder and camera portions 24, 26, 28 and 30. Each of the cameras has a corresponding field of view 34, 36, 38 and 40, respectively. In the example of FIG. 1, objects 42 and 44 are within the fields of view 34 and 36 of the corresponding cameras.

Figure 2:
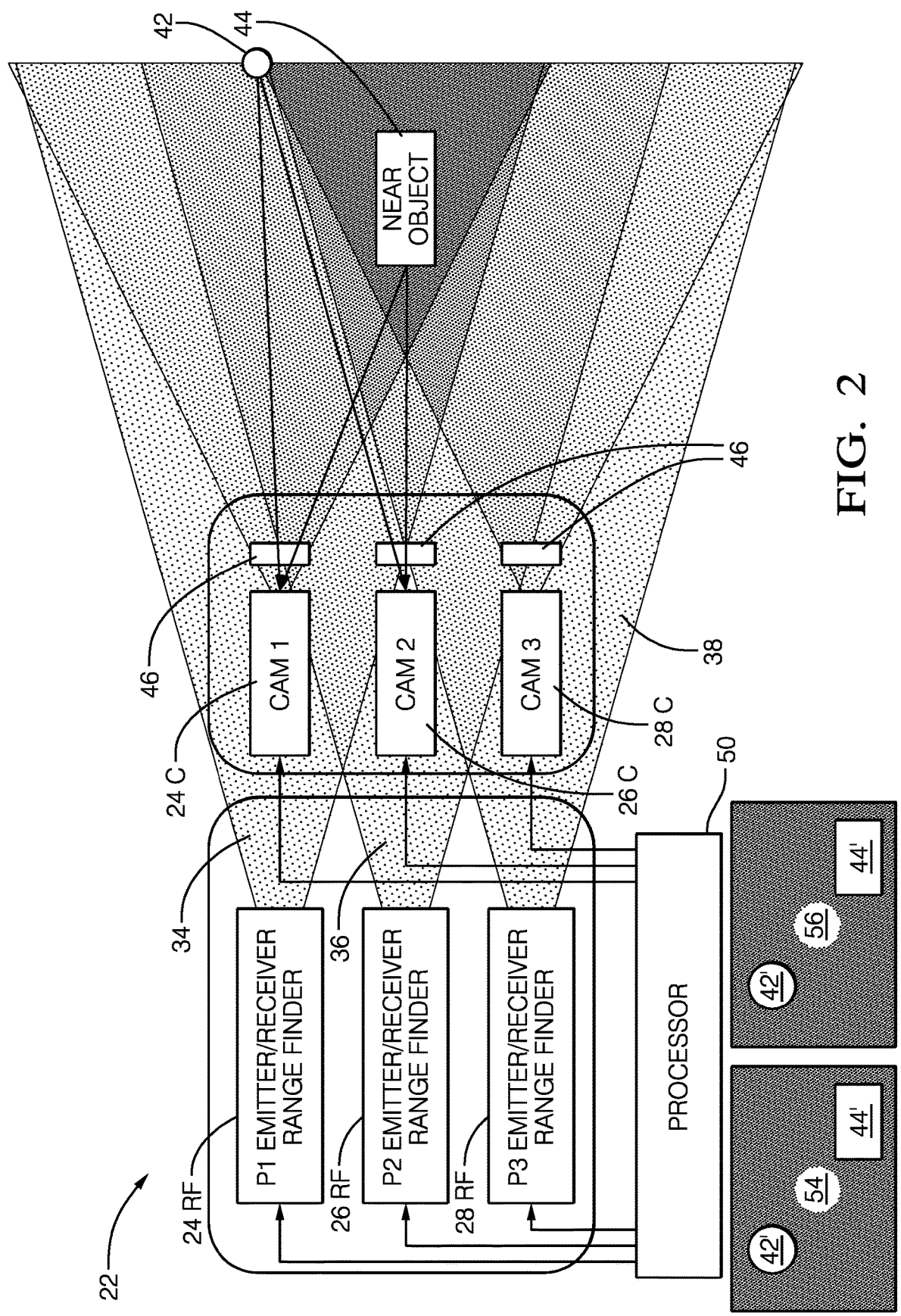
FIG. 2 schematically illustrates selected features of a sensor device designed according to an embodiment of this invention.

FIG. 2 schematically illustrates selected features of the sensor device 22. A range finder 24RF includes an emitter and a detector. The emitter emits a selected type of radiation within at least the field of view 34 of the camera 24C. Another range finder 26RF emits the selected type of radiation over at least the field of view 36 of the camera 26C. Similarly, the camera 28C is associated with the range finder 28RF that includes an emitter and a detector of the selected type of radiation. A processor 50 receives information from the range finders and cameras, such as range indications and images, and makes determinations regarding any detected objects.

In the illustrated example, the cameras 24C, 26C and 28C are configured to only detect the type of radiation emitted by the range finders 24RF, 26RF and 28RF. This example includes filters 46 associated with the cameras 24C-28C that filter out radiation other than the selected type of radiation emitted by the range finders 24RF-28RF. In an example embodiment, the selected type of radiation is near infrared radiation (NIR).

The radiation emitted by the range finders reflects off the objects 44 and 42 and is detected by at least the cameras 24C and 26C in this example. The cameras 24C and 26C each generate an image 54, 56 of the objects 42 and 44 and provide the respective images 54, 56 to the processor 50.

The images 54, 56 generated by the cameras can be considered binary images in that they provide or include an indication of a detected object within the image and otherwise are blank. In FIG. 2, an example image 54 is provided by the camera 24C and an image 56 is provided by the camera 26C. The images include a representation of the object 42 at 42' and a representation of the object 44 at 44'. Otherwise, the images are blank (e.g., black in the illustrated example).

Utilizing the range finders and cameras that are configured to detect only the type of radiation emitted by the range finders allows for establishing images that provide unambiguous information regarding objects within the field of view of the camera without having to process information regarding other visible features that would otherwise be included in an image, such as shadows or background. Therefore, the image processing requirements imposed on the processor 50 are significantly reduced compared to conventional stereoscopic image processing techniques. The illustrated embodiment therefore allows for achieving the benefits of the accuracy available from a stereoscopic camera approach while avoiding the drawbacks of intensive processing and image analysis that would otherwise be necessary.

The processor 50 is configured to utilize the images 54 and 56 to determine information about the objects 42 and 44. The processor 50 uses known stereoscopic image processing techniques in one example to use the differences between the images 54, 56 from the different cameras to determine information such as the distance to each object, the position of the objects and their approximate size. Some embodiments include determining all three while others only determine one or two, such as just the distance.

The range finders 24RF-28RF provide an indication of the range or distance to the objects 42 and 44 based on known time of flight calculation techniques using the radiation emitted by the range finder emitter, reflected off of an object, and detected by the detector of the corresponding range finder.

The range information from the range finders provides an estimate of a distance to an object. The stereoscopic information from images from more than one of the cameras provides additional distance information. According to the illustrated example, the range finder distance information provides a reference that the processor 50 uses to verify or check the distance information obtained from the images provided by the cameras.

In some embodiments, the processor 50 utilizes range information from one or more of the range finders as a calibration to calibrate the cameras. For example, the processor 50 determines whether information from a range finder corresponds to distance information from camera images within a selected tolerance and adjusts or calibrates a feature of a camera when necessary.

Another way in which the range information from the range finders is useful in the illustrated embodiment is for selecting which of the cameras to use as the source of images for making distance, location and object size determinations. Such an optimum camera selection for image processing purposes reduces or eliminates distance calculation errors.

Figure 3:
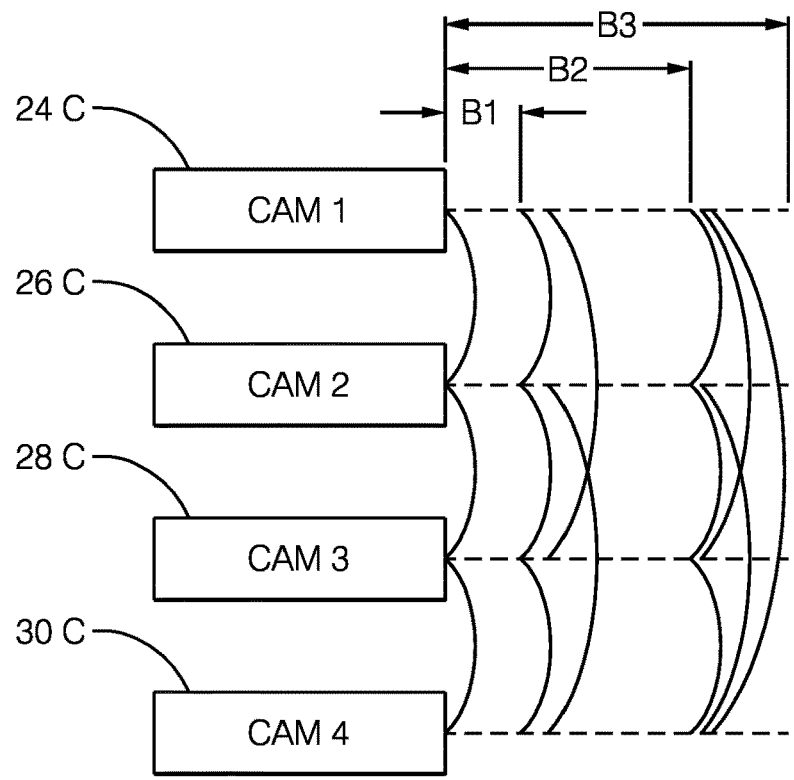
FIG. 3 schematically illustrates a range basis feature of an example embodiment.

FIG. 3 schematically represents aspects of a technique of determining which camera images to select based on an indication from one or more of the range finders 24RF-28RF. When an object is within a first basis or base line range B1, the processor 50 determines to use two cameras that are immediately adjacent to each other and the images from those cameras. For example, if the cameras 24C and 26C both include a representation of an object within their respective images and the range finder indication indicates that the object is within the first basis or base line range B1 from the cameras, the processor 50 will utilize the image information from the cameras 24C and 26C for making determinations regarding that object. Other object positions within the same range may indicate that it would be more appropriate to use another set of two adjacent cameras, such as cameras 28C and 30C in some circumstances or 26C and 28C in other circumstances. The curved lines between cameras in the B1 range represent the possible camera combinations when a detected object is in the first range B1.

Under some circumstances, an object will be further from the cameras or sensor device 22 within a second base line range B2. Within this range, any two of three adjacent cameras may be used. The curved lines in FIG. 3 within the B2 range represent the possible camera combinations. For example, an image from the cameras 24C and 28C or 26C and 28C could be used provided that all of the cameras 24C, 26C and 28C include a representation of the object in their respective images. Alternatively, the processor 50 may select images from the cameras 28C and 30C, 26C and 28C, or 26C and 30C when the object is positioned within the respective camera fields of view, beyond the range B1, and within the range B2.

When an object is even further from the cameras in a range B3, the processor 50 may use any two of the four example cameras and images from those cameras for purposes of making determinations regarding an object. The curved vertical lines furthest from the cameras (i.e., furthest to the right in the drawing) represent the possible camera combinations when a detected object is beyond the B1 and B2 range and within the B3 range.

In addition to being able to determine a distance to an object, the illustrated example provides information regarding the location of the object based on the relative position of the representation of an object in the images provided by the cameras. Known stereoscopic image processing techniques to determine location are used in some example embodiments.

Figure 4:
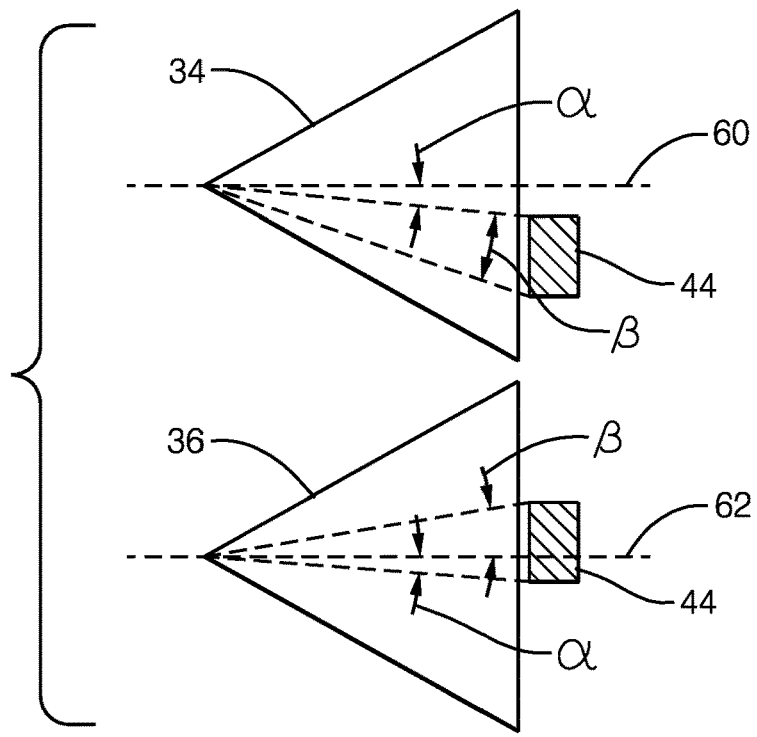
FIG. 4 schematically illustrates selected features of a process of determining an object size based on images from two different cameras.

FIG. 4 schematically illustrates a portion of an image processing technique used by the processor 50 to determine the size of a detected object in the images. In this embodiment, the processor 50 is capable of providing a determination of at least an approximate size of an object based on twice the product of the range and the tangent of one-half of the object field coverage.

The field of view 34 has a camera axis or centerline 60 and the object 44 is situated off of that axis. The edges of the object 44 relative to the camera axis 60 provide information regarding field angles of the object in the image. The angle labeled α in FIG. 3 is the angle that is nearer to the optical axis 60 of the camera 24C. The angle β is the larger of the two angles or further from the optical axis 60. When an object is offset from the optical axis of the corresponding camera, the processor 50 determines the size of the object using the formula Rx(tan β)−Rx(tan α), wherein R is the range to the object, which can be the distance determined by the processor 50 based on the stereoscopic image processing or the range provided by the corresponding range finder 24RF.

The field of view 36 represented in FIG. 4 corresponds to that of the camera 26C. In this example, the object 44 overlaps the optical axis 62 of the camera 26C. Under such circumstances, the processor 50 uses the formula: Rx(tan β)+Rx(tan α), where R is the range as mentioned above.

FIG. 5 schematically illustrates another feature of the illustrated example embodiment. This approach is useful, for example, when rolling shutter cameras are included as part of the sensor device 22. A camera has a frame period or duration F during which the camera detects the radiation from an object in the camera's field of view. Rather than having a single range finder emitter emitting radiation across the duration of the entire frame F, the example of FIG. 5 includes pulsing more than one range finder emitter to provide radiation for purposes of detecting an object during the frame. A first range finder emitter emits radiation during a first portion 80 of the frame F. A second, different range finder emits radiation during a portion 82 of the frame F. Collectively, the first portion 80 and the second portion 82 have a duration at least as long as the entire duration of the frame F. In the example of FIG. 5, there is slight overlap between the first portion 80 and the second portion 82.

FIG. 6 illustrates another example in which there is more overlap between respective range finder emitter pulses for a first portion 90 and a second portion 92 of the frame F'. The example of FIG. 6 is useful for a long exposure integration time or total frame duration F' for every row of the camera.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

We claim:

1. A sensor system, comprising:
    a plurality of range finders, each of the range finders including at least one emitter that is configured to emit a selected frequency range of radiation and at least one detector configured to detect the selected frequency range of radiation, the range finders being configured to provide an indication of a distance between the range finders and an object based on the selected frequency range of radiation reflected from an object and detected by the detectors;
    a plurality of cameras that are configured to generate respective images of the object based on only detecting the selected frequency range of radiation from the object, each of the plurality of cameras associated with a respective one of the plurality of range finders; and
    a processor that is configured to determine a distance between the sensor system and the object based on differences between at least two of the images of the object from respective ones of the cameras.

2. The sensor system of claim 1, wherein the processor is configured to determine the distance between the sensor system and the object by not processing information regarding other visible features within a field of view of the respective ones of the cameras, the other visible features not detectable by the plurality of cameras based on the selected frequency range of radiation.

3. The sensor system of claim 2, wherein the plurality of cameras comprise at least one filter that filters out any radiation other than the selected frequency range of radiation.

4. The sensor system of claim 2, wherein the selected frequency range of radiation comprises near infrared radiation.

5. The sensor system of claim 2, wherein the only objects in the images of the respective cameras are objects from which the selected frequency range of radiation is detected.

6. The sensor system of claim 1, wherein the processor is configured to determine a size of the object based on a relationship between edges of the object and a camera axis in the respective images.

7. The sensor system of claim 1, wherein the processor is configured to use the indication from the range finders as an estimate of the distance between the sensor system and the object in the images.

8. The sensor system of claim 1, wherein the processor is configured to:
    determine a range basis from the indication from the range finders; and
    select a number of the cameras from which to obtain an image of the object dependent on the determined range basis.

9. The sensor system of claim 8, wherein the processor is configured to:
    determine which of the cameras generated an image of the object; and
    select the number of the cameras from among the cameras that generated an image of the object.

10. The sensor system of claim 1, wherein:
    the cameras have a frame duration for generating an image;
    at least a first one of the emitters emits the selected frequency range of radiation for a first portion of the frame duration;
    at least a second one of the emitters emits the selected frequency range of radiation for a second portion of the frame duration; and
    the first and second portions of the frame duration collectively are at least as long as the frame duration.

11. A method of determining a distance to an object, the method comprising:
    emitting a selected frequency range of radiation from a respective range finder emitter of a plurality of range finders;
    detecting only the selected frequency range of radiation from the object at each of a plurality of cameras, each of the plurality of cameras associated with a respective one of the plurality of range finders;
    generating an image of the object from each of the cameras based on detecting the selected frequency range of radiation from the object; and
    determining the distance to the object based on differences between at least two of the images of the object, wherein the at least two of the images are each from a different one of the cameras.

12. The method of claim 11, wherein determining the distance to the object based on differences between at least two of the images of the object does not include processing information regarding other visible features within a field of view of the respective ones of the cameras, the other visible features not detectable by the plurality of cameras based on the selected frequency range of radiation.

13. The method of claim 12, wherein the plurality of cameras comprise at least one filter that filters out any radiation other than the selected frequency range of radiation.

14. The method of claim 12, wherein the selected frequency range of radiation comprises near infrared radiation.

15. The method of claim 12, wherein generating the image of the object comprises only including a representation of objects in the image from which the selected frequency range of radiation is detected.

16. The method of claim 11, further comprising determining a size of the object based on a relationship between edges of the object and a camera axis in the respective images.

17. The method of claim 11, comprising:
    determining a range to the object based on an indication from a range finder detector of at least one of the plurality of range finders that detects the selected frequency range of radiation; and using the determined range as an estimate of the distance to the object in the images.

18. The method of claim 11, comprising:

determining a range basis from an indication from a range finder detector of at least one of the plurality of range finders that detects the selected frequency range of radiation; and selecting a number of the cameras from which to obtain an image of the object dependent on the determined range basis.

19. The method of claim 18, comprising:

determining which of the cameras generated an image of the object; and selecting the number of the cameras from among the cameras that generated an image of the object.

20. The method of claim 11, wherein:

the cameras have a frame duration for generating an image;

the method comprises emitting the selected frequency range of radiation from at least a first emitter of at least one of the plurality of range finders for a first portion of the frame duration and emitting the selected frequency range of radiation from at least a second emitter of the at least one of the plurality of range finders for a second portion of the frame duration; and the first and second portions of the frame duration collectively are at least as long as the frame duration.

\* \* \* \* \*